United States Patent [19]
Lee et al.

[11] Patent Number: 5,712,896
[45] Date of Patent: Jan. 27, 1998

[54] METHOD FOR DIAGNOSING A FAULT OF DIGITAL EXCHANGER

[75] Inventors: Sang-Ho Lee; Jeoung-Lak Ha; Sung-Hee Kim, all of Daejeon; Young-Tack Park, Seoul, all of Rep. of Korea

[73] Assignee: Electronics and Telecommunications Research Institute, Daejeon, Rep. of Korea

[21] Appl. No.: 692,136

[22] Filed: Aug. 5, 1996

[30] Foreign Application Priority Data

Aug. 5, 1995 [KR] Rep. of Korea ............. 95/24218

[51] Int. Cl.⁶ ..................... H04M 1/24; H04M 3/08
[52] U.S. Cl. ................. 379/10; 379/14; 379/15; 379/29
[58] Field of Search ................. 379/1, 2, 10, 14, 379/15, 21, 22, 27, 29

[56] References Cited

U.S. PATENT DOCUMENTS

| | | | |
|---|---|---|---|
| 4,972,453 | 11/1990 | Daniel, III et al. | 379/10 |
| 5,293,556 | 3/1994 | Hill et al. | 379/10 |
| 5,384,822 | 1/1995 | Brown et al. | 379/10 |
| 5,521,958 | 5/1996 | Selig et al. | 379/27 |
| 5,528,660 | 6/1996 | Heins et al. | 379/21 |
| 5,533,093 | 7/1996 | Horton et al. | 379/27 |

OTHER PUBLICATIONS

The treatise entitled "A knowledge based message interpretation for the maintenance of an electronic switching system" by Kim, et al., pp. 334–340.

The treatise entitled "Design and implementation of real-time expert system for troubleshooting in international telephone networks" by Matsumoto, et al., pp. 345–352.

*Primary Examiner*—Curtis Kuntz
*Assistant Examiner*—Vijay Shankar
*Attorney, Agent, or Firm*—Antonelli, Terry, Stout & Kraus, LLP

[57] ABSTRACT

In the present invention, an expert system is coupled to the fault management function of a switching system for diagnosing various faults which occur in an electronic switching system and an interface module is coupled to the expert system, so that a user can diagnose a fault of the switching system and monitor a result of the fault. The expert system of the present invention has a knowledge base including information relating to faults of the switching system and when a fault occurs in the switching system, the expert system outputs information of the fault occurrence to a multimedia screen so that a user can recognize a fault immediately and diagnose the fault of the switching system.

3 Claims, 7 Drawing Sheets

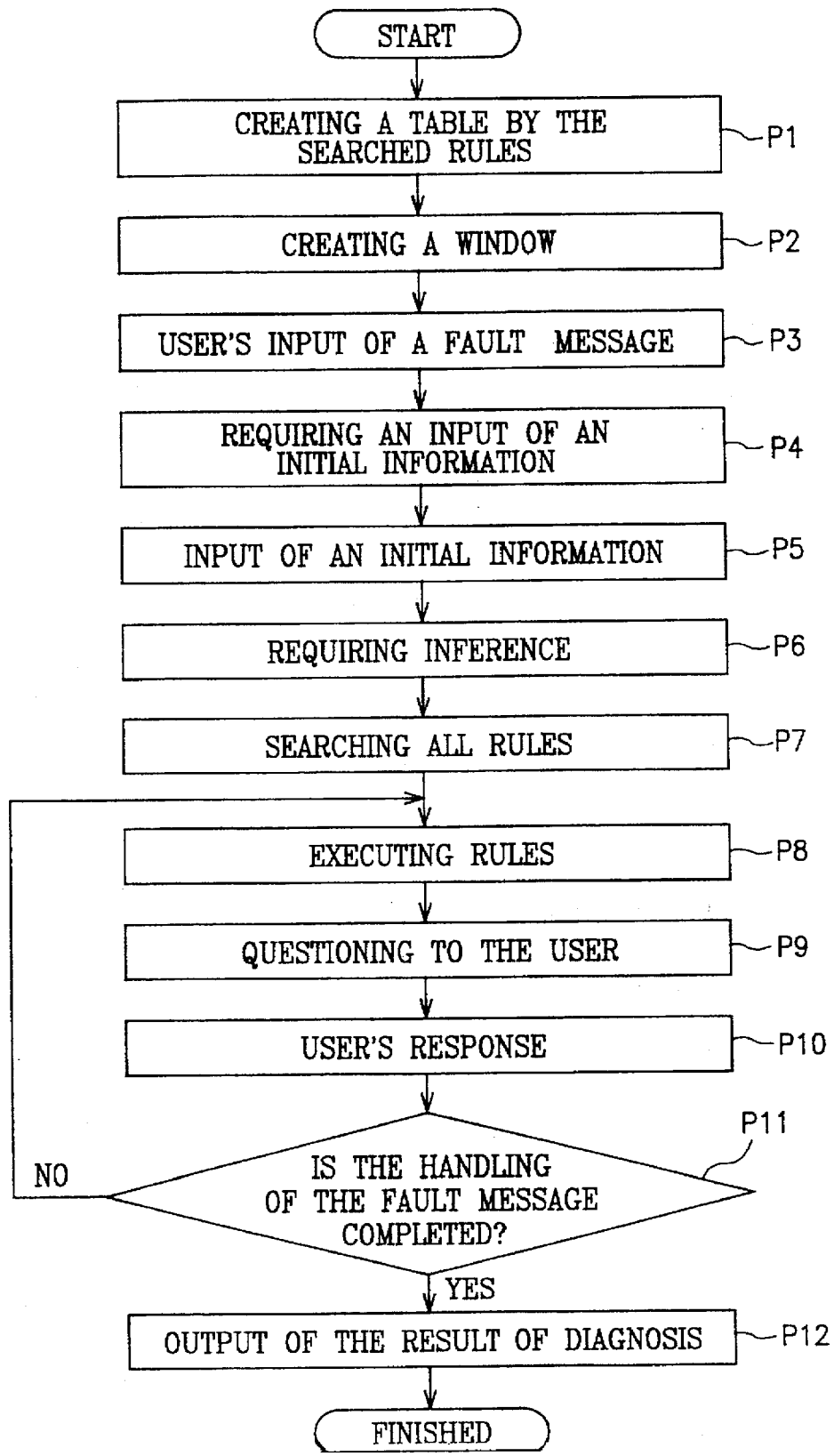

METHOD FOR DIAGNOSING A FAULT OF DIGITAL EXCHANGER

BACKGROUND OF THE INVENTION

1. Field of the invention

The present invention relates to a method for diagnosing a fault of digital exchanger, and in particular such a method which performs a fault diagnosis of various faults occurring in an electronic exchanger by using a knowledge base.

2. Description of the Prior Art

An electronic exchanger is constructed by various components such as hardwares and softwares and various faults may occur with each component.

There are several types of fault handling functions such as a fault detection function, a fault isolation function, a fault report function, a fault correction function, and a state recovery function.

The fault detection function is to detect a fault by using a fault detection function in of hardware or using a fault detection algorithm in software.

The fault isolation function is to isolate a source, in which a fault occurs, from a service and the fault report function is to report fault occurrence information to a user.

The fault correction function is to correct the fault regularly after diagnosing a fault state which occurs in source.

A state recovery function is to recover any faulted state to a regular service state.

In general, the fault detection, the fault report, and the fault isolation functions are operated automatically, whereas the fault correction and the fault recovery functions may be operated by a user and cannot be operated automatically in a system.

At this time, the user of the system performs a fault handling using knowhow of accumulated experience or a documented fault handling guideline.

The diagnosing of a fault in digital exchanger is disclosed in U.S. Pat. No. 4,972,453.

In the prior art, a PBX (which is referred to Switching as a System in a stored program control system in general) which diagnosed is coupled to the Public Telephone Network. The Public Telephone Network is coupled to a plurality of PBXs and an expert system constructed by a computer is used for diagnosing faults of PBXs.

In addition, the Public Telephone Network includes a Service Reporting Center which reports and record fault of the PBXs. The expert system accesses the Service Reporting Center via the Public Telephone Network and recognize a fault information and performs fault diagnosis with a constructed rule base and clears the fault.

The expert system maintains an accessed result previously performed to a database and use it in a fault diagnosis procedure later.

Accordingly, in a case when a fault occurs in a system, there is a problem that a fault handling expert or an experienced user only can take a measure immediately, but an unexperienced system user cannot take a measure immediately.

That is, in the prior art, as mentioned above, the fault information of the object of the fault diagnosis can only be obtained via the Service Reporting Center in the Public Telephone Network and the fault messages and the diagnosis information can not be outputted as text type.

SUMMARY OF THE INVENTION

An object of the present invention is to provide a fault diagnosis expert system capable of performing a role of a user having varied experience in fault handling in an operation of an electronic exchanger.

To achieve the above object the invention is a method for diagnosing a fault using a fault diagnosis expert system in an electronic switching system comprising searching rules corresponding to each fault message of the electronic system among all fault a messages according to an instruction of fault diagnosis and creating a table of a relationship between the searched rules and each fault message creating a window on a multimedia screen inputted one of the fault message same kind as the fault message showing the multimedia a semicolon requiring an input of initial information corresponding to the inputted fault message; inputting initial information in accordance with the questions of fault diagnosis expert system; executing applicable rules among rules searched which are by the fault diagnosis expert system selecting a message a corresponding to a question rule among the messages the defined as a question message and questioning the user via an interface module executing an operation in accordance with the questions presented by the fault diagnosis expert system and inputting results, so that the interface module transfers the user's resposence relating to the question to the fault diagnosis expert system; and determining whether the handling of the fault message is completed and outputting the result to a the created window.

A processing procedure calls kinds of fault and a diagnosis process in an occurrence of a fault of a switching system.

The processing procedure is constructed as a knowledge base after analysis and when a fault occurs an expert system performs optimum diagnosis and processing via an inference procedure using the knowledge base.

BRIEF DESCRIPTION OF THE DRAWINGS

FIG. 7 is a flow chart of a state transition of FIG. 6 in detail.

DESCRIPTION OF THE PREFERRED EMBODIMENT

Hereinafter, a preferred embodiment in accordance with the present invention will be described with reference to the accompanying drawings.

Figure 1:
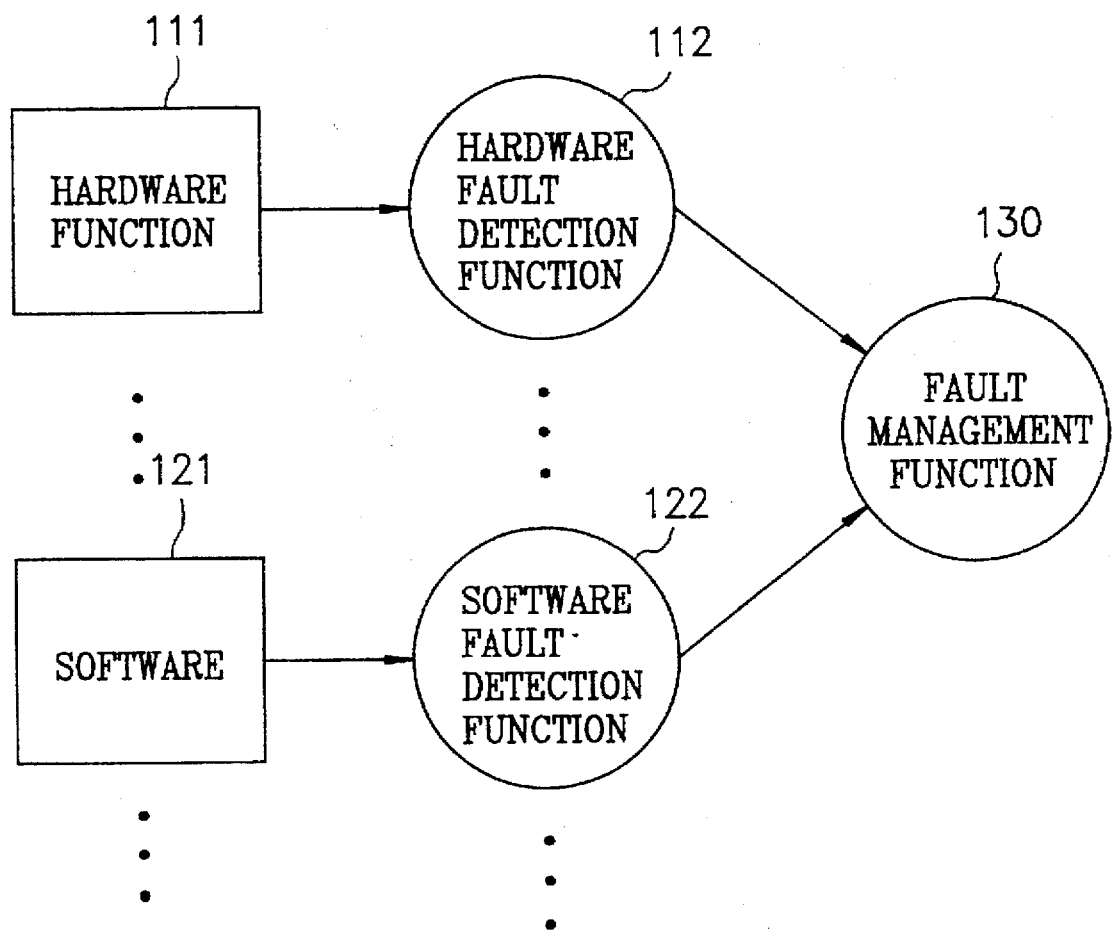
FIG. 1 is a block diagram of fault handling in a switching system or an exchange.

FIG. 1 is a schematic view of fault handling in a switching system or an exchange.

Referring to FIG. 1, a switching system or an exchange comprises various hardware functions and softwares.

In the switching system or the exchange, hardware function (111) comprises a speech path which is necessary for a call processing, control device having a signal device and a distributed system, an input/output device and an auxiliary memory device.

Software (121) which is executed by the hardware function (111) and performs several functions such as call processing, running, maintaining/repairing operation the hardware and data management.

In the operation of the hardware 111 or the software 121, a fault may occur. The state of a fault occurring is detected by either a hardware software fault detection function (112) which detects the fault by using a hardware fault detection function or by a software fault detection function (122) which detects a fault by an algorithm in software the detected fault is reported to a fault management function (130).

The fault management function (130) collects information of all faults which occur in the switching system and performs a fault management such as logging in each fault and thereafter reports the fault messages to a user.

Figure 2:
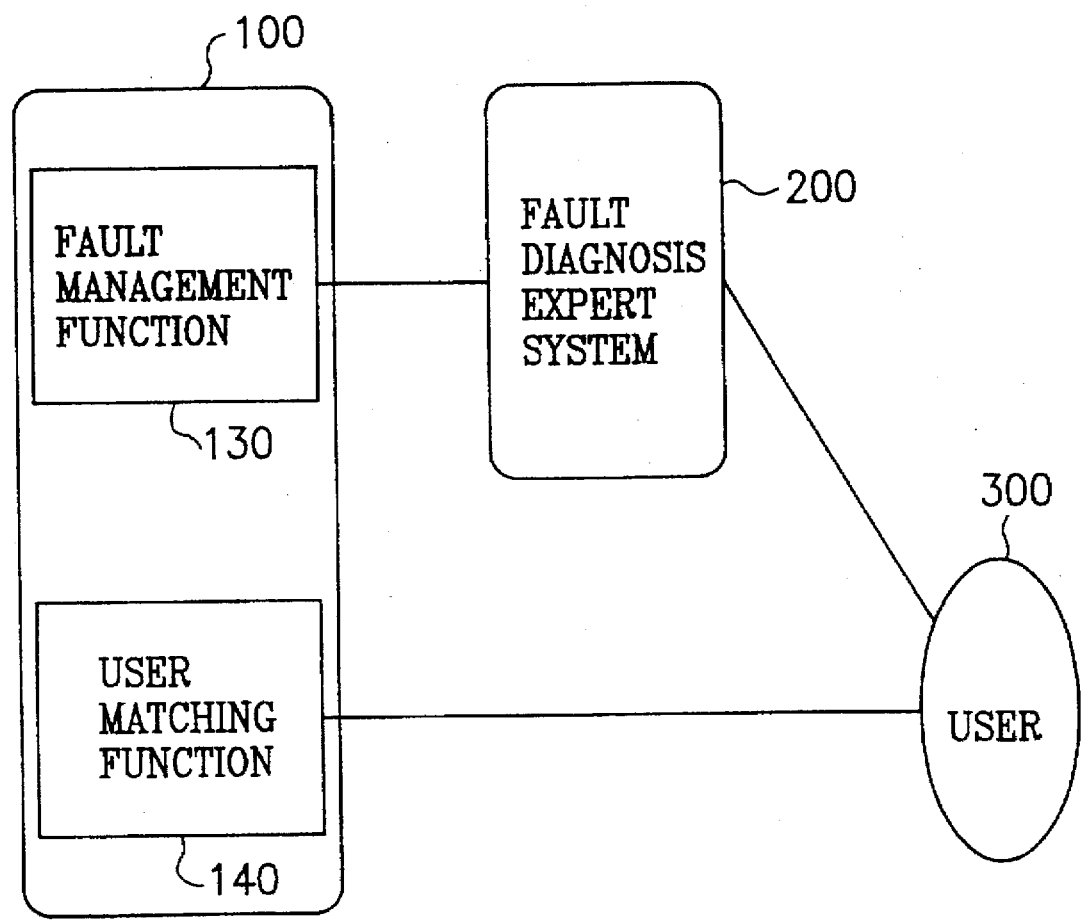
FIG. 2 is a block diagram function of a switching system or an exchange and the relationship between an expert system and a user.

FIG. 2 is a block diagram a fault maintaining function of a switching system and relationship between an expert system and a user.

Referring to FIG. 2, a fault message is outputted from switching system 100 to a user via a fault diagnosis expert system (200) and a user matching function (140).

The user matching function (140) performs not only interfacing a user(300) and the switching system (100), but also transfer an order from the user (300) to the switching system (100), and performs a function for transferring a message from the switching system (100) to the user (300).

The fault diagnosis expert system (200) outputs a fault message received from the fault management function (130) of the switching system (100) to the user (300), and performs fault diagnosis by using a constructed fault diagnosis knowledge in accordance with a requirement for diagnosing the fault from the user and then outputs a result of a fault diagnosis to the user.

The user (300), as an operator of the switching system, performs a fault diagnosis by using a fault diagnosis expert system.

Figure 3:
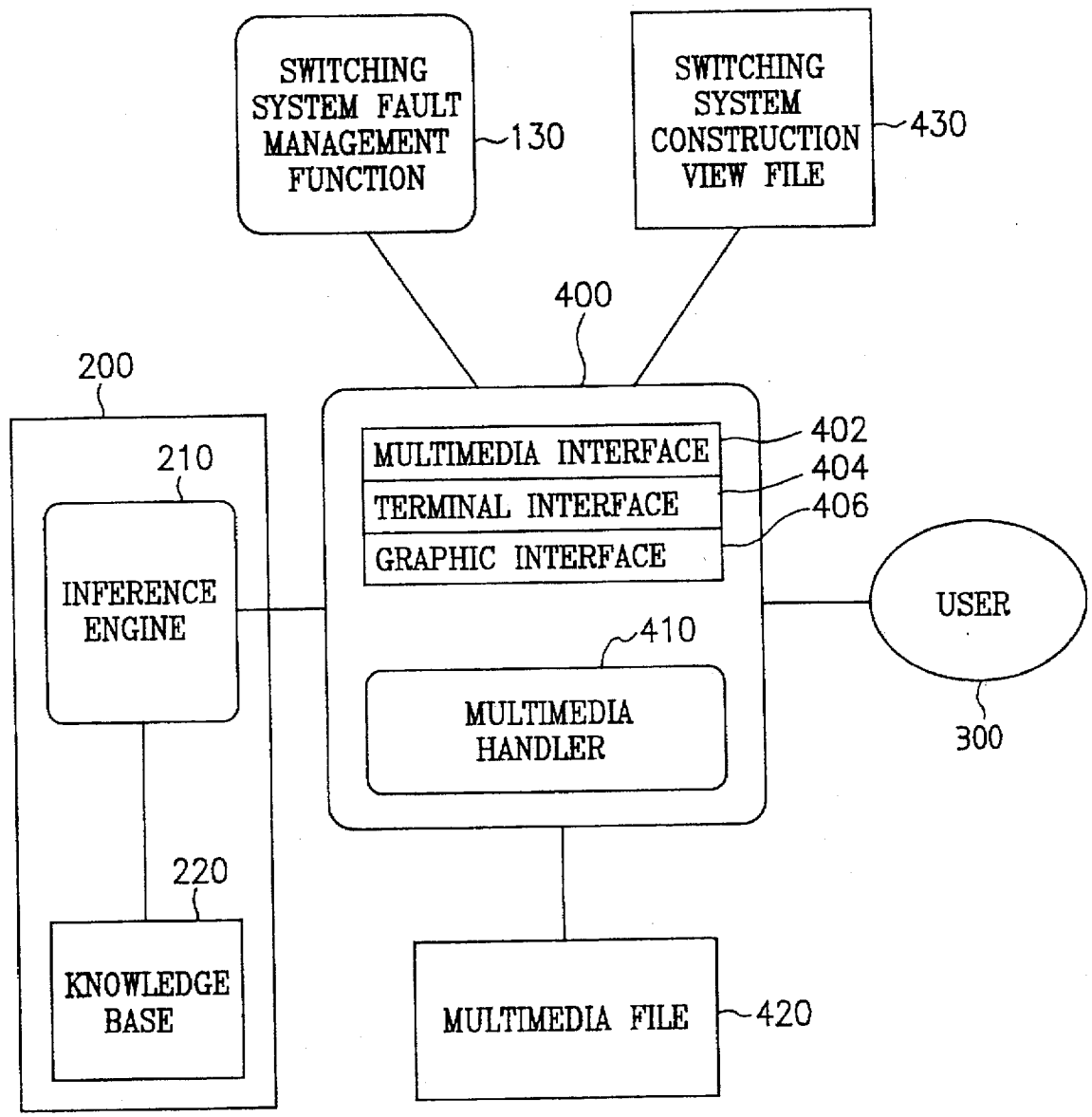
FIG. 3 is a block diagram of the fault diagnosis expert system of FIG. 2.

FIG. 3 is a block diagram of a fault diagnosis expert system of FIG. 2.

Referring to FIG. 3, the fault diagnosis expert system (200) includes an inference engine (210) and a knowledge base (220).

The inference engine (210) infers on the basis of the knowledge base (220) and communicates with a user via a multimedia interface (402) or a graphic interface 406 of an interface module 400 questions and test relating to a diagnosis, if necessary.

The the inference engine (220) searches and selects a corresponding rule in accordance with a fault message and then performs the selected rule.

The knowledge base (220) creates a table of the relationship between rule of the knowledge base and a fault message.

The knowledge base (220) comprises conditions for completing a diagnosis, fact which are required for the initialization of a diagnosis, rules for inferring a fault message, and questions provided to a user, if necessary.

The interface module (400) comprises a terminal interface (404), a graphic interface (406), a multimedia interface (402) and a multimedia handler (410).

The terminal interface (404) output a fault message received from the fault management function (130) of the switching system.

The graphic interface (406) reports a diagnosis to the user (300) via a corresponding window according to the instructions from the inference engine (210) and receives a response from the user and then transfers it to the inference engine (210).

The the multimedia interface (402) interfaces the situation of diagnosis and video/audio drive in accordance with the query from the user.

Moreover, the multimedia handler (410) searches a video/audio drive file in accordance with the query of the user or the result of the diagnosis and the cause of the fault message.

The interface module (400) stores data using a multimedia file (420) and a switching system construction view file and reads the data.

The multimedia file (420) stores video/audio data including queries for presentation to the user in diagnosis processing and causes and effects of faults.

The switching system construction view file (430) shows the placement of hardware of the switching system (100). In starting, the fault diagnosis expert system reads the construction file and outputs a screen of the switching system construction, as an object of the fault diagnosis, and indicates the location of fault in case that a fault occurs.

Figure 4:
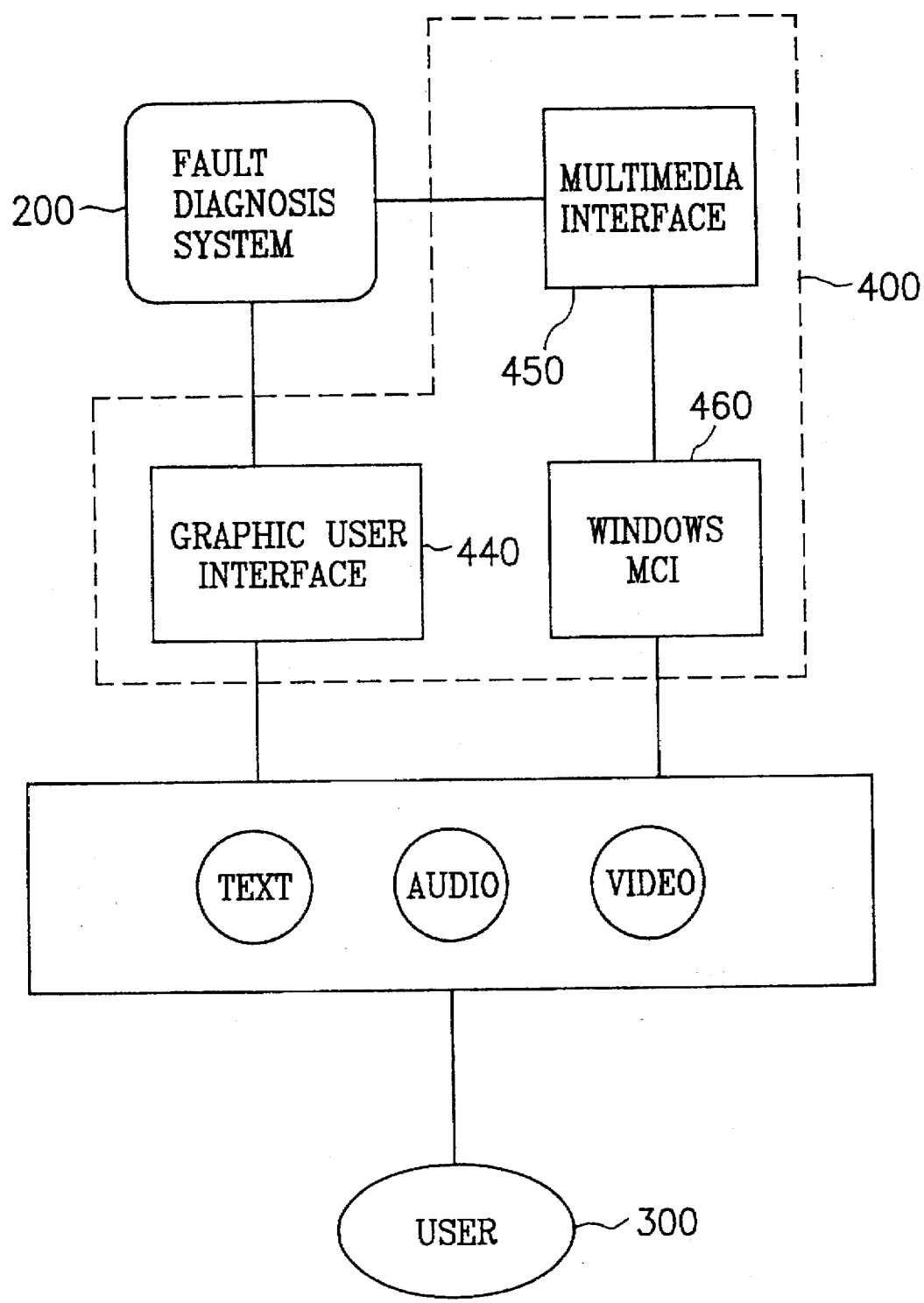
FIG. 4 is a block diagram of a diagnosis system and a multimedia function in accordance with the present invention.

FIG. 4 is a block diagram of a connection of a diagnosis system and a multimedia function.

Referring to FIG. 4, the connection of the fault diagnosis system and the multimedia function will be described in detail.

The fault diagnosis system, which is constructed by the knowledge base (220) and the inference engine (210), is drawn up by PROLOG, as an artificial intelligence programming language and a multimedia interface (450) is drawn by the C programming language.

Accordingly, the interaction of the fault diagnosis system (200) and the multimedia interface (450), when the fault diagnosis system calls an interface function, which is drawn with a DLL(Dynamic Link Library), if necessary, the multimedia interface manages the call by using MCI(460) in the window.

Figure 5:
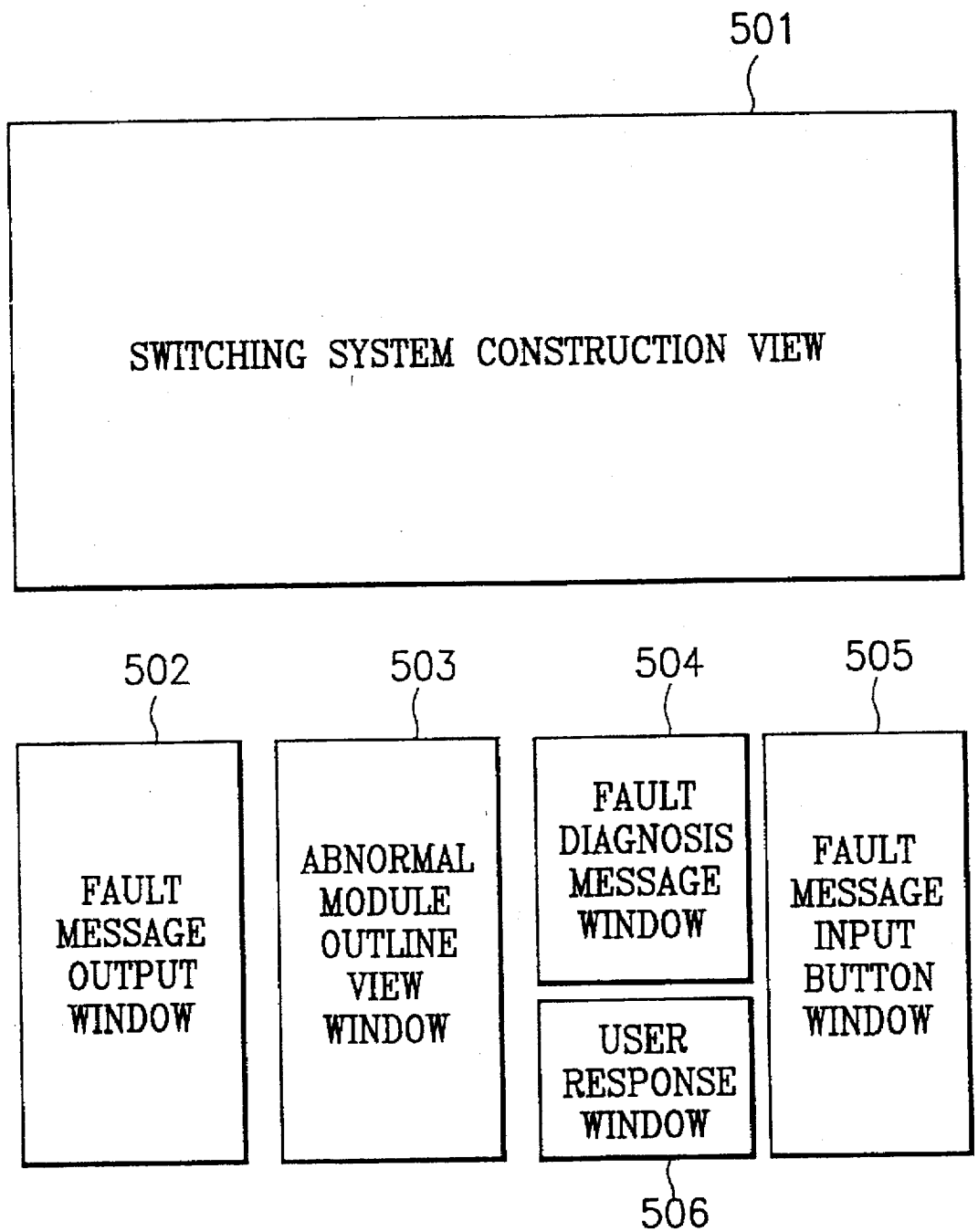
FIG. 5 is a view of a basic screen of a fault diagnosis expert system in accordance with the present invention.

FIG. 5 is a view of a basic screen of a fault diagnosis expert system.

Referring to FIG. 5, a switching system construction view (501) occupies a wide area of the screen and a fault message output window (502), an abnormal module outline view (503), a fault diagnosis message window (504) and a fault message input button window (505) are formed in turn from the left below the switching system construction view (501), and a user response window (506) is formed below the fault diagnosis message window (504).

Figure 6:
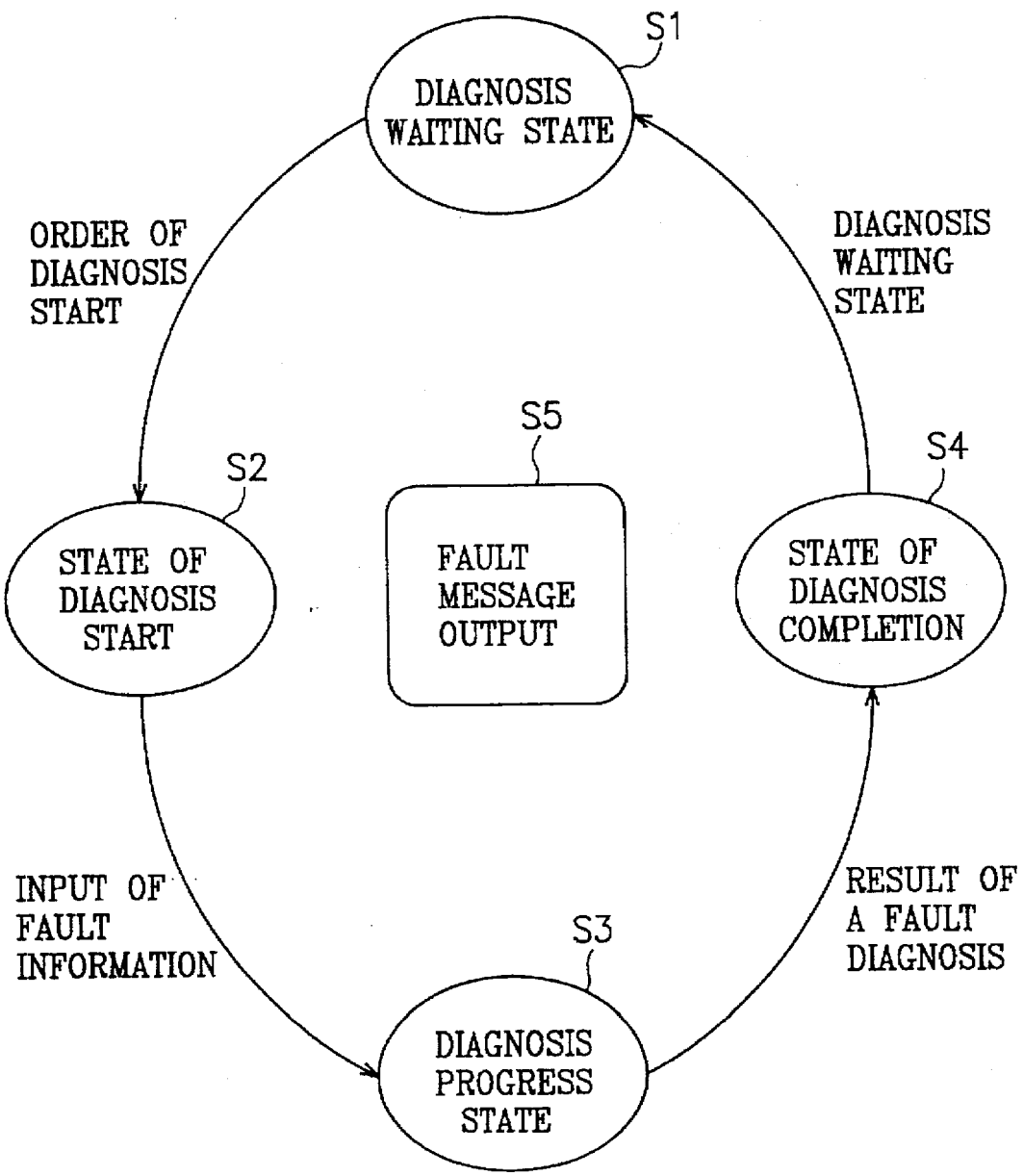
FIG. 6 is a state diagram of transitions of a fault diagnosis expert system.

FIG. 6 is a view showing state transitions of a fault diagnosis expert system.

Referring to FIG. 6, the fault diagnosis expert system (200) is initially changed to a diagnosis waiting state (S1) upon startup and waits for an order of diagnosis from a user.

A fault message received from a switching system fault management function (130) is outputted to a fault message output window (502) at (S5).

When a user pushes the fault message input button, corresponding to the outputted fault message, the system (200) is changed to a diagnosis start state (S2).

The system is changed to a diagnosis progress state (S3) in accordance with the input of fault information such as a position of fault from a user. In the state (S3), the system (200) exchange a question with the user.

When the diagnosis is completed, the fault diagnosis expert system (200) outputs a result of a fault diagnosis and is changed to the state of diagnosis completion (S4) and is changed to the diagnosis waiting state (S1) which wait for an order of fault diagnosis.

FIG. 7 is a flow chart of state transitions view of FIG. 6 in detail.

Referring to FIG. 7, a process of fault diagnosis in a fault diagnosis expert system will be described in detail.

At first, when starting the fault diagnosis expert system, the system becomes initialized.

The fault diagnosis expert system searches rules corresponding to each fault message among all fault messages and creates a table by the searched rules (P1).

The fault diagnosis expert system creates a window to a multimedia screen (P2).

Thereafter, a user inputs a fault message which is the same kind as the fault message shown on the multimedia screen (P3).

Thereafter, the fault diagnosis expert system requires an input of initial information from the user corresponding to the inputted fault message (P4).

The fault diagnosis expert system, simultaneously with step P4, outputs a general explanation of the fault message and additionally provides picture and voice in accordance with the input of the initial information.

Thereafter, the user inputs initial information in accordance with the questions of the fault diagnosis expert system (P5).

Following up the previous step, an interface module requires an inference for diagnosing the fault diagnosis by the expert system (P6).

Thereafter, the fault diagnosis expert system searches all rules relating to the corresponding fault messages on the basis of the table (P7).

Thereafter, the fault diagnosis expert system searches what is applicable among the searched rules and executes those applicable rules (P8).

In a questioned rule among the executed rules in the fault diagnosis expert system, the system selects a message corresponding to the questioned rule among the messages defined as a questioned message and then provides questions to the user via an interface module (P9).

The user executes an operation in accordance with the questions presented by the fault diagnosis system and then inputs the results, so that an interface module transfers the user's response relating to the question to the fault diagnosis expert system (P10).

The fault diagnosis expert system determines whether the handling of the fault message is completed (P11).

In the determination (P11), when the handling of the fault message is not completed, the fault diagnosis expert system progresses to the step P8, when the handling of the fault message is completed, the fault diagnosis expert system is progresses to the step P12.

Thereafter, the fault diagnosis expert system outputs the result of the diagnosis to the electronic switching system and is finished (P12).

Accordingly, in accordance with the present invention, a real-time processing is possible because fault correction is executed by a computer system, and not by the accumulated experiences of the system user. Since a specific diagnosis knowledge is provided by the fault diagnosis knowledge as stored, a diagnosis of the switching system become more effective and the switching system is maintained and repaired more effectively.

The foregoing description of preferred embodiment of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. A method for diagnosing fault messages using a fault diagnosis expert system in an electronic switching system comprising:

searching rules corresponding to each fault message of the electronic switching system among all fault messages and creating a table of a relationship between the searched rules and each fault message;

creating a window on a multimedia screen for each fault message;

inputting one of the fault messages;

requiring an input of initial information corresponding to the inputted fault message;

inputting initial information in accordance with questions from the fault diagnosis expert system;

executing applicable rules from rules which are searched by the fault diagnosis expert system;

selecting a message and questioning the user via an interface module;

executing an operation in accordance with the questions presented by the fault diagnosis expert system and inputting results so that the interface module transfers the user's response relating to the questions to the fault diagnosis expert system; and determining whether the handling of the fault message is completed and outputting the result to the created window.

2. The method according to claim 1, wherein:

the fault diagnosis expert system performs feedback to the executing applicable rules when handling of the inputted fault message is not completed.

3. The method according to the claim 1, wherein:

the fault diagnosis expert system, in requiring an input of initial information, outputs a general explanation of the fault message and additionally a moving picture and voice in accordance with the input of the initial information.

* * * * *